US009148049B2

(12) United States Patent
Li

(10) Patent No.: US 9,148,049 B2
(45) Date of Patent: Sep. 29, 2015

(54) DISCHARGE CIRCUITS FOR EMI FILTERS CAPACITORS AND METHODS THEREOF

(71) Applicant: Chengdu Monolithic Power Systems Co., Ltd., Chengdu (CN)

(72) Inventor: En Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 270 days.

(21) Appl. No.: 13/793,606

(22) Filed: Mar. 11, 2013

(65) Prior Publication Data

US 2013/0242626 A1    Sep. 19, 2013

(30) Foreign Application Priority Data

Mar. 16, 2012   (CN) .......................... 2012 1 0070179

(51) Int. Cl.
*H02M 1/32*        (2007.01)
*H02M 1/36*        (2007.01)
*G02B 9/02*        (2006.01)

(52) U.S. Cl.
CPC . *H02M 1/36* (2013.01); *G02B 9/02* (2013.01); *H02M 1/32* (2013.01); *H02M 2001/322* (2013.01)

(58) Field of Classification Search
CPC .... H02M 2001/322; H02M 1/32; H02M 1/36
See application file for complete search history.

(56) References Cited

U.S. PATENT DOCUMENTS

| 8,115,457 | B2 | 2/2012 | Balakrishnan et al. | |
| 2010/0309694 | A1* | 12/2010 | Huang et al. | 363/49 |
| 2012/0007567 | A1 | 1/2012 | Disney et al. | |
| 2012/0112564 | A1* | 5/2012 | Wu et al. | 307/326 |
| 2013/0044403 | A1 | 2/2013 | Urienza | |
| 2013/0049706 | A1* | 2/2013 | Huang et al. | 320/166 |
| 2013/0147440 | A1* | 6/2013 | Shiroyama et al. | 320/166 |
| 2014/0036561 | A1* | 2/2014 | Sakurai et al. | 363/126 |

FOREIGN PATENT DOCUMENTS

JP    WO2012033120 A1 *  3/2012
JP    WO2012140840 A1 * 10/2012

* cited by examiner

*Primary Examiner* — Harry Behm
(74) *Attorney, Agent, or Firm* — Perkins Coie LLP

(57) ABSTRACT

A discharge circuit for an EMI filter capacitor, wherein the EMI filter capacitor is coupled between input terminals of a switching converter. The discharge circuit has a detecting circuit and a current source. The detecting circuit is configured to detect whether an electrical source is coupled to the input terminals of the switching converter. The current source is coupled between the input terminals of the switching converter and a power supply capacitor, and is configured to provide a power supply voltage across the power supply capacitor. When the electrical source is uncoupled from the input terminals of the switching converter, the EMI filter capacitor is discharged by the current source.

10 Claims, 8 Drawing Sheets

US 9,148,049 B2

DISCHARGE CIRCUITS FOR EMI FILTERS CAPACITORS AND METHODS THEREOF

CROSS-REFERENCE TO RELATED APPLICATION(S)

This application claims the benefit of CN application 201210070179.9, filed on Mar. 16, 2012, and incorporated herein by reference.

TECHNICAL FIELD

The present invention generally relates to electronic circuits, and more particularly but not exclusively to discharge circuits for EMI filter capacitors.

BACKGROUND

Electromagnetic interference (EMI) filters are often used in switching converters to reduce the amount of EMI. The EMI filter often includes capacitors, such as X capacitors, coupled between the input terminals of the switching converter. When an electrical source is uncoupled from the input terminals of the switching converter, the voltage across the X capacitor may be maintained high and be risky to persons who touch the switching converter after the electrical source has been uncoupled.

To minimize the risk, one or more discharge resistors are normally coupled across the X capacitor to reduce the voltage of the X capacitor to a safe threshold value (e.g. 50V) when the electrical source is uncoupled from the switching converter. However, power is continually dissipated on the discharge resistors even when the electrical source is coupled to the switching converter, which definitely reduces the efficiency of the switching converter, especially under light load and no load conditions.

SUMMARY

Embodiments of the present invention are directed to a discharge circuit for an EMI filter capacitor, wherein the EMI filter capacitor is coupled between input terminals of a switching converter. The discharge circuit comprises a detecting circuit and a current source. The detecting circuit is configured to detect whether an electrical source is coupled to the input terminals of the switching converter, and configured to generate a flag signal based on the detection. The current source is coupled between the input terminals of the switching converter and a power supply capacitor, and is configured to provide a power supply voltage across the power supply capacitor. When the electrical source is uncoupled from the input terminals of the switching converter, the EMI filter capacitor is discharged by the current source.

In one embodiment, the discharge circuit further comprises a first switch and a second switch. The first switch has a first terminal, a second terminal and a control terminal, wherein the first terminal is coupled to the current source, the second terminal is coupled to ground, and the control terminal is coupled to the detecting circuit to receive the flag signal. The second switch has a first terminal, a second terminal and a control terminal, wherein the first terminal is coupled to the current source and the first terminal of the first switch, the second terminal is coupled to the power supply capacitor, and the control terminal is coupled to the detecting circuit to receive the flag signal. When the electrical source is uncoupled from the input terminals of the switching converter, the first switch is turned on and the second switch is turned off. When the electrical source is coupled to the input terminals of the switching converter, the first switch is turned off and the second switch is turned on.

In another embodiment, when the electrical source is uncoupled from the input terminals of the switching converter, the current source is configured to transfer the energy stored in the EMI filter capacitor to the power supply capacitor.

BRIEF DESCRIPTION OF THE DRAWINGS

The present invention can be further understood with reference to the following detailed description and the appended drawings, wherein like elements are provided with like reference numerals.

DETAILED DESCRIPTION

Figure 1:
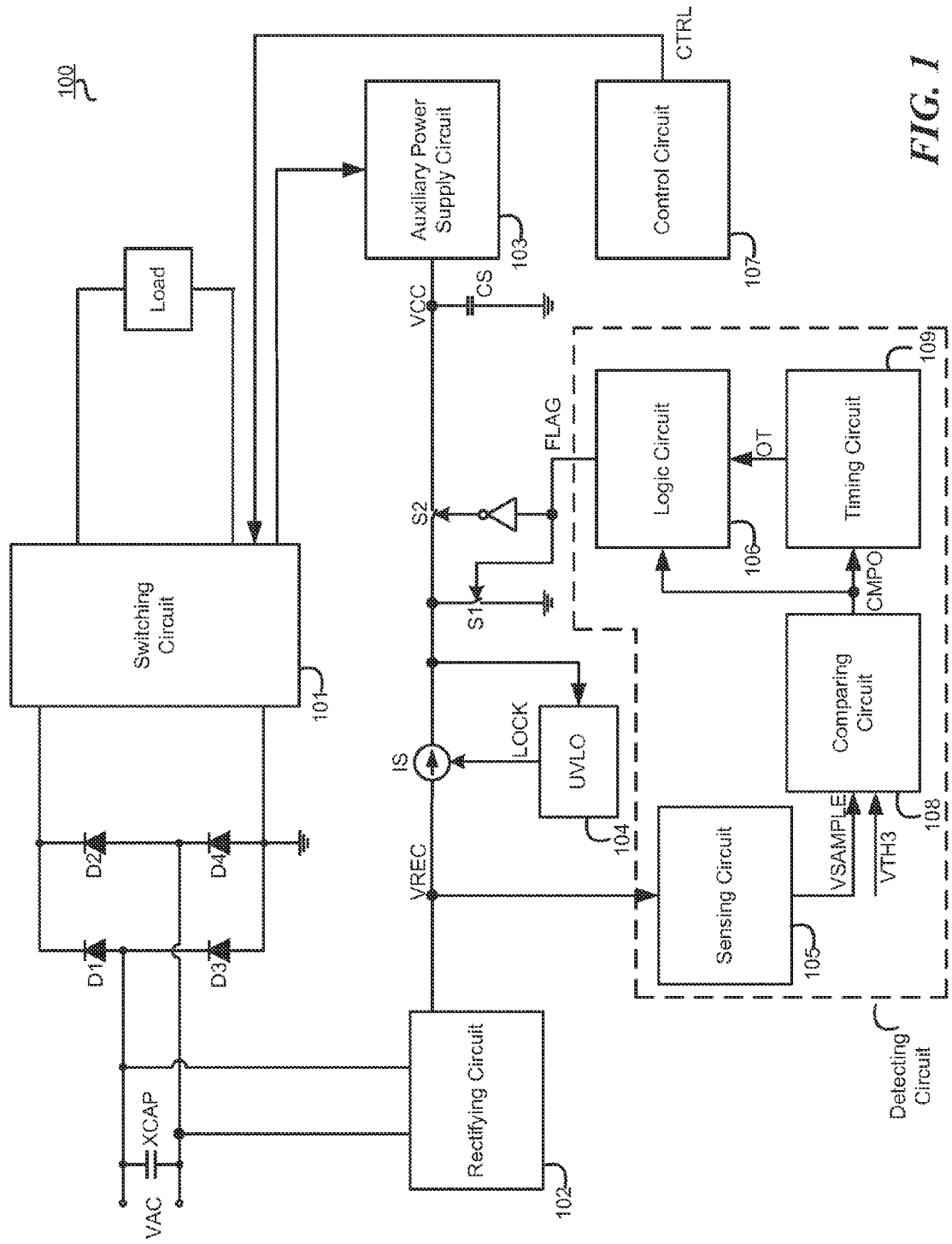
FIG. 1 is a block diagram of a switching converter 100 with a discharge circuit for an EMI filter capacitor, in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

As described in the prior art, although the discharge resistors coupled across the EMI filter capacitor can reduce the voltage of the capacitor to a safe threshold value after the electrical source has been uncoupled from the switching converter, the discharge resistors keep dissipating power even when the electrical source is coupled to the switching converter. The efficiency of the switching converter is limited, especially under light load and no load conditions.

To solve the problem mentioned above, a discharge circuit for an EMI discharge capacitor is provided in embodiments of the present invention. The discharge circuit comprises a detecting circuit and a current source. The current source is coupled to a power supply capacitor, and is configured to provide a power supply voltage across the power supply capacitor. The detecting circuit is configured to detect whether an electrical source is coupled to the input terminals of the switching converter. When the electrical source is uncoupled from the input terminals of the switching converter, the current source is used to discharge the EMI filter capacitor. In one embodiment, the EMI filter capacitor is discharged until its voltage reaches a safe threshold value, such as 50V. Since the current source is used to discharge the EMI filter capacitor, the discharge resistors in the prior art can be eliminated or at least reduced. The power loss is reduced, and the efficiency is enhanced, especially under light load and no load conditions. Furthermore, since the current source is not only used for discharge, but also used for power supply, the size as well as the cost of the discharge circuit is minimized.

Switching converters coupled to an AC electrical source will be set as examples in the embodiments illustrated below. Persons of ordinary skill in the art can recognize, however, that the teaching of the present invention can be applied to any system coupled to an electrical source, wherein the capacitor coupled between the input terminals of the system may be risky to persons who touch the system after the electrical source has been uncoupled from the input terminals of the system.

FIG. 1 is a block diagram of a switching converter 100 with a discharge circuit for an EMI filter capacitor, in accordance with an embodiment of the present invention. The switching converter 100 comprises an EMI filter capacitor XCAP, a rectifier bridge, a switching circuit 101, a control circuit 107, a rectifying circuit 102 and a discharge circuit for the EMI filter capacitor. The switching converter 100 has two input terminals used to couple to an electrical source. The capacitor XCAP is coupled between these two input terminals. In one embodiment, the capacitor XCAP comprises one or more X capacitors. The rectifier bridge comprising diodes D1~D4 receives a voltage VAC from the input terminals of the switching converter and rectifies it. The switching circuit 101 is coupled to the output terminals of the rectifier bridge. The switching circuit 101 comprises at least one switch, and is configured to regulate the energy provided to a load through the ON and OFF switching of the at least one switch. The control circuit 107 is coupled to the switching circuit 101 to provide a control signal CTRL, so as to control the at least one switch in the switching circuit 101. The switching circuit 101 may be configured in any DC/DC or DC/AC topologies, such as BOOST converter, BUCK converter, FLYBACK converter and so on. The switches in the switching circuit 101 may be any controllable semiconductor devices, such as MOSFET (metal oxide semiconductor field effect transistor), IGBT (isolated gate bipolar transistor) and so on.

The rectifying circuit 102 comprises a first input terminal, a second input terminal and an output terminal, wherein the first and second input terminals are respectively coupled to the two input terminals of the switching converter 100 to receive the voltage VAC. The rectifying circuit 102 rectifies the voltage VAC and generates a rectifying signal VREC at the output terminal. The rectifying circuit 102 may be configured in full-bridge, full-wave or half-bridge structures. The discharge circuit is coupled to the output terminal of the rectifying circuit 102. It comprises a current source IS, switches S1, S2 and a detecting circuit. The detecting circuit is configured to detect whether the electrical source is coupled to the input terminals of the switching converter 100, and configured to generate a flag signal FLAG based on the detection. The current source IS has an input terminal, an output terminal and a control terminal, wherein the input terminal is coupled to the output terminal of the rectifying circuit 102. The switch S1 has a first terminal, a second terminal and a control terminal, wherein the first terminal is coupled to the output terminal of the current source IS, the second terminal is coupled to ground, and the control terminal is coupled to the detecting circuit to receive the flag signal FLAG. The switch S2 has a first terminal, a second terminal and a control terminal, wherein the first terminal is coupled to the output terminal of the current source IS and the first terminal of the switch S1, and the control terminal is coupled to the detecting circuit to receive the flag signal FLAG. A power supply capacitor CS is used to provide a power supply voltage VCC for the discharge circuit. The capacitor CS has a first terminal and a second terminal, wherein the first terminal is coupled to the second terminal of the switch S2, the second terminal is coupled to the ground.

When the electrical source is uncoupled from the input terminals of the switching converter 100, the switch S1 is turned on and the switch S2 is turned off. The capacitor XCAP is discharged by the current source IS. When the electrical source is coupled to the input terminals of the switching converter 100, the switch S1 is turned off and the switch S2 is turned on. The current source IS provides energy to the capacitor CS.

In one embodiment, the discharge circuit further comprises an under voltage lock out (UVLO) circuit 104. The UVLO circuit 104 has an input terminal and an output terminal, wherein the input terminal is coupled to the first terminal of the switch S1, the output terminal is coupled to the control terminal of the current source IS. The UVLO circuit 104 compares the voltage across the switch S1 with threshold voltage VTH1 and VTH2, and generates a lock out signal LOCK at the output terminal to turn on or turn off the current source IS. When the voltage across the switch S1 is increased to reach the threshold voltage VTH1, the current source IS is turned off by the UVLO circuit 104. When the voltage across the switch S1 is decreased to reach the threshold voltage VTH2, the current source IS is turned on by the UVLO circuit 104. The threshold voltage VTH1 is larger than the threshold voltage VTH2. In one embodiment, the threshold voltage VTH1 is 12V, the threshold voltage VTH2 is 8V.

In one embodiment, the switching converter 100 further comprises an auxiliary power supply circuit 103. The auxiliary power supply circuit 103 has an input terminal and an output terminal, wherein the input terminal is coupled to the switching circuit 101, and the output terminal is coupled to the first terminal of the capacitor CS. When the power converter 100 just starts up, the power supply voltage VCC has not been built up and the switching circuit 101 is not in normal operation. The current source IS is used to provide energy to the capacitor CS. After the startup of the power converter 100 is finished, the switching circuit 101 starts to work. The auxiliary power supply circuit 103 is mainly used to provide energy to the capacitor CS. In one embodiment, the discharge circuit and the control circuit 107 are integrated in a controller, such as a control IC. The capacitor CS is used to provide the power supply voltage for the controller.

When the electrical source is coupled to the switching converter 100, the rectifying signal VREC is a rectified sinusoidal wave. When the electrical source is uncoupled from the switching converter 100, the rectifying signal VREC becomes a stable DC value which is determined by the instantaneous voltage of the electrical source. So, the detecting circuit may monitor the status of the rectifying signal VREC to determine whether the electrical source is coupled to the switching converter 100. Of course, the detection may also be realized through monitoring any other electrical signal which is relative to the input voltage or input current of the switching converter 100.

In one embodiment, the detecting circuit comprises a sensing circuit 105, a comparing circuit 108, a timing circuit 109 and a logic circuit 106. The sensing circuit 105 has an input terminal and an output terminal, wherein the input terminal is coupled to the output terminal of the rectifying circuit 102 to receive the rectifying signal VREC. Based on the rectifying signal VREC, the sensing circuit 105 generates a sensing signal VSAMPLE at the output terminal. The comparing circuit 108 has a first input terminal, a second input terminal and an output terminal, wherein the first input terminal is coupled to the output terminal of the sensing circuit 105 to receive the sensing signal VSAMPLE, the second input terminal is coupled to receive a threshold voltage VTH3. The comparing circuit 108 compares the sensing signal VSAMPLE with the threshold voltage VTH3 and generates a comparing output signal CMPO at the output terminal. The timing circuit 109 has an input terminal and an output terminal, wherein the input terminal is coupled to the output terminal of the comparing circuit 108 to receive the comparing output signal CMPO. Based on the comparing output signal CMPO and a time threshold TTH, the timing circuit 109 generates a time out signal OT at the output terminal. The logic circuit 106 has a first input terminal, a second input terminal and an output terminal, wherein the first input terminal is coupled to the output terminal of the comparing circuit 108 to receive the comparing output signal CMPO, the second input terminal is coupled to the output terminal of the timing circuit 109 to receive the time out signal OT. Based on the comparing output signal CMPO and the time out signal OT, the logic circuit 106 generates the flag signal FLAG at the output terminal.

The existence of the rectifying circuit 102 can reduce the number of the high voltage devices in the discharge circuit. However, persons of ordinary skill in the art can recognize that, the rectifying circuit 102 is not necessary. The discharge circuit may comprise two circuits which are similar to the discharge circuit shown in FIG. 1 and are coupled to the two input terminals of the switching converter 100 directly.

Figure 2:
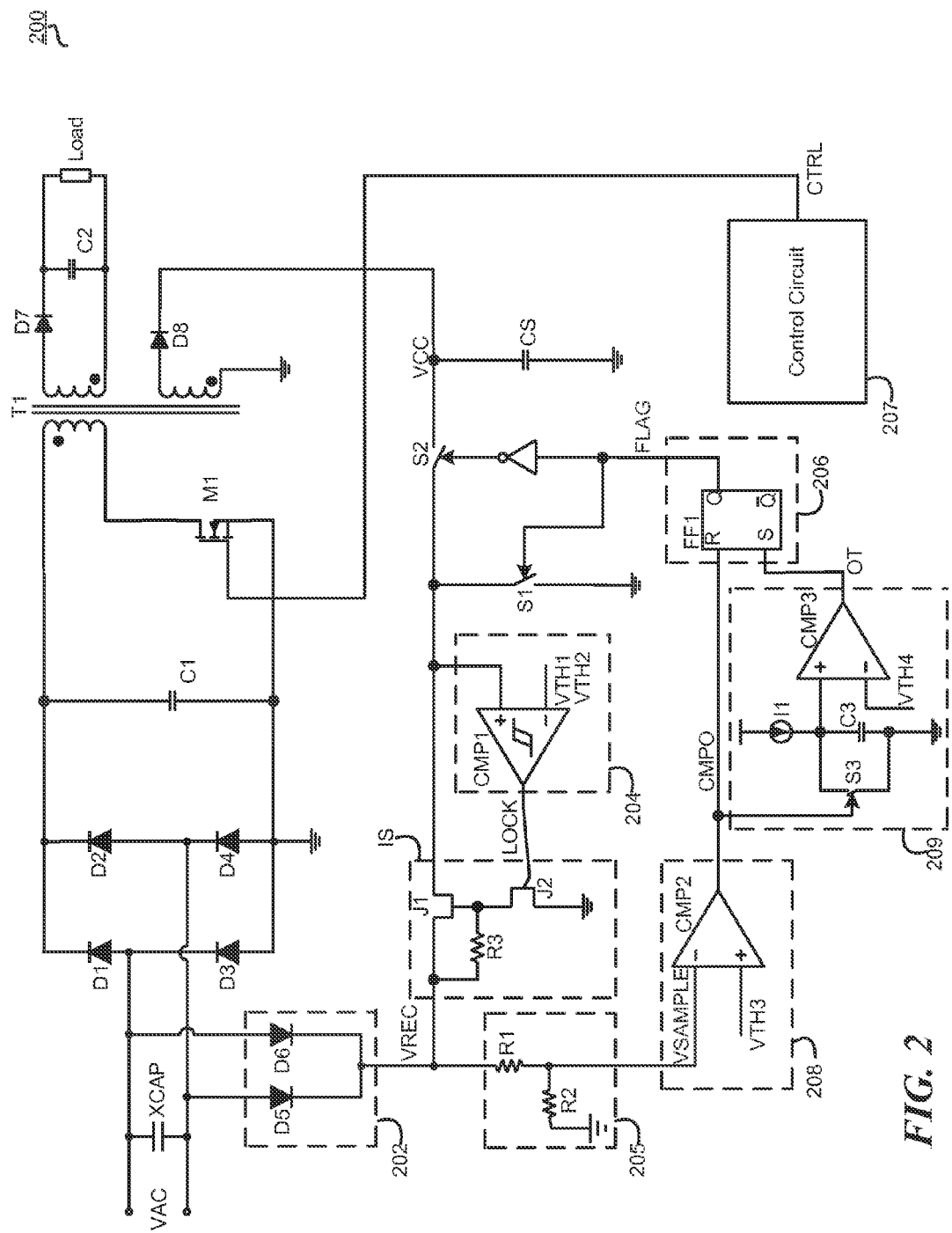
FIG. 2 schematically illustrates a switching converter 200 with a discharge circuit for an EMI filter capacitor, in accordance with an embodiment of the present invention.

FIG. 2 schematically illustrates a switching converter 200 with a discharge circuit for an EMI filter capacitor, in accordance with an embodiment of the present invention. The switching converter 200 comprises an EMI filter capacitor XCAP, a rectifier bridge consisting of diodes D1~D4, a switching circuit, a control circuit 207, a rectifying circuit 202 and a discharge circuit. The switching circuit is configured in a FLYBACK converter. It comprises capacitors C1, C2, a switch M1, a transformer T1 and a diode D7. The transformer T1 has a primary winding, a secondary winding and an auxiliary winding. The auxiliary winding of the transformer T1 is coupled to the first terminal of the power supply capacitor CS through a diode D8, so as to provide auxiliary power supply. The control circuit 207 is coupled to the control terminal of the switch M1 to provide a control signal CTRL.

The rectifying circuit 202 comprises diodes D5 and D6. The anodes of the diodes D5 and D6 are respectively coupled to the two input terminals of the switching converter 200. The cathodes of the diodes D5 and D6 are coupled together to provide a rectifying signal VREC. The discharge circuit comprises a current source IS, switches S1, S2, a detecting circuit and an UVLO circuit 204. The current source IS includes junction field effect transistors (JFETs) J1, J2 and a resistor R3. The transistor J1 has a first terminal, a second terminal and a control terminal. The first terminal of the transistor J1 is configured as the input terminal of the current source IS, and is coupled to the output terminal of the rectifying circuit 202 to receive the rectifying signal VREC. The second terminal of the transistor J1 is configured as the output terminal of the current source IS. The resistor R3 has a first terminal and a second terminal, wherein the first terminal is coupled to the first terminal of the transistor J1, the second terminal is coupled to the control terminal of the transistor J1. The transistor J2 has a first terminal, a second terminal and a control terminal, wherein the first terminal is coupled to the second terminal of the resistor R3 and the control terminal of the transistor J1, the second terminal is coupled to the ground. The control terminal of the transistor J2 is configured as the control terminal of the current source IS. In other embodiments, the current source IS may be configured in other suitable structures. The switch S1 has a first terminal, a second terminal and a control terminal, wherein the first terminal is coupled to the second terminal of the transistor J1, the second terminal is coupled to the ground, and the control terminal is coupled to the detecting circuit to receive the flag signal FLAG. The switch S2 has a first terminal, a second terminal and a control terminal, wherein the first terminal is coupled to the second terminal of the transistor J1 and the first terminal of the switch S1, the second terminal is coupled to the first terminal of the capacitor CS, and the control terminal is coupled to the detecting circuit to receive the flag signal FLAG.

The UVLO circuit 204 comprises a hysteresis comparator CMP1. The hysteresis comparator CMP1 has a non-inverting input terminal, an inverting input terminal and an output terminal, wherein the non-inverting input terminal is coupled to the first terminal of the switch S1, the inverting input terminal is coupled to receive threshold voltage VTH1 and VTH2, and the output terminal is coupled to the control terminal of the transistor J2 to provide a lock out signal LOCK. When the voltage across the switch S1 is increased to reach the threshold voltage VTH1, the lock out signal LOCK is changed from logical low into logical high. The transistor J2 is turned on and the transistor J1 is turned off. The current source IS is turned off. When the voltage across the switch S1 is decreased to reach the threshold voltage VTH2, the lock out signal LOCK is changed from logical high into logical low. The transistor J2 is turned off and the transistor J1 is turned on. The current source IS is turned on. In one embodiment, the UVLO circuit 204 may comprise a plurality of comparators and gate circuits.

The detecting circuit comprises a sensing circuit 205, a comparing circuit 208, a timing circuit 209 and a logic circuit 206. The sensing circuit 205 comprises a resistor divider consisting of resistors R1 and R2. The comparing circuit 208 comprises a comparator CMP2. The comparator CMP2 has a non-inverting input terminal, an inverting input terminal and an output terminal, wherein the non-inverting input terminal is coupled to receive a threshold voltage VTH3, the inverting input terminal is coupled to the output terminal of the sensing circuit 205 to receive the sensing signal VSAMPLE, and the output terminal is configured to provide a comparing output signal CMPO. In one embodiment, the threshold voltage VTH3 is a constant value which is corresponding to the safe threshold value (such as 50V).

The timing circuit 209 counts the time when the sensing signal VSAMPLE is larger than the threshold voltage VTH3, and compares the time value with a time threshold TTH to generate a time out signal OT. The timing circuit 209 comprises a current source I1, a capacitor C3, a switch S3 and a comparator CMP3. The current source I1 has an input terminal and an output terminal, wherein the input terminal is configured to receive a reference voltage. The capacitor C3 has a first terminal and a second terminal, wherein the first terminal is coupled to the output terminal of the current source I1, the second terminal is coupled to the ground. The switch S3 has a first terminal, a second terminal and a control terminal, wherein the first terminal is coupled to the first terminal of the capacitor C3, the second terminal is coupled to the ground, and the control terminal is coupled to the output terminal of the comparator CMP2 to receive the comparing output signal CMPO. The comparator CMP3 has a non-inverting input terminal, an inverting input terminal and an output terminal, wherein the non-inverting input terminal is coupled to the first terminal of the capacitor C3, the inverting input terminal is coupled to receive a threshold voltage VTH4, and the output terminal is configured to provide the time out signal OT. In other embodiments, the timing circuit 209 may be realized by digital circuits.

The time threshold TTH can be set through adjusting the current source I1, the capacitor C3 or the threshold voltage VTH4. Generally, the time threshold TTH1 is set to be larger than a half period of the AC electrical source. In one embodiment, the frequency of the AC electrical source is 50 Hz, and the time threshold TTH is set to 20 ms.

The logic circuit 206 comprises a flip-flop FF1. The flip-flop FF1 has a reset terminal R, a set terminal S and an output terminal Q, wherein the reset terminal R is coupled to the output terminal of the comparing circuit 208 to receive the comparing output signal CMPO, the set terminal S is coupled to the output terminal of the timing circuit 209 to receive the time out signal OT, and the output terminal is configured to provide the flag signal FLAG. The set terminal S and the reset terminal R are both rising edge effective.

When the sensing signal VSAMPLE is smaller than the threshold voltage VTH3, the comparing output signal CMPO is logical high. The switch S3 is turned on. The voltage across the capacitor C3 is discharged to zero and the time out signal OT is logical low. When the sensing signal VSAMPLE is larger than the threshold voltage Vth3, the comparing output signal CMPO is logical low. The switch S3 is turned off. The capacitor C3 is charged by the current source I1, the voltage across the capacitor C3 is increased. If the electrical source is coupled to the switching converter 200, the sensing signal VSAMPLE will become smaller than the threshold voltage VTH3 again before the voltage across the capacitor C3 reaches the threshold voltage VTH4, the timing circuit 209 will be reset. The switch S3 will be turned on. The voltage across the capacitor C3 will be quickly discharged to zero, and the time out signal OT will be maintained low.

If the electrical source is uncoupled from the switching converter 200, the sensing signal VSAMPLE may keep larger than the threshold voltage VTH3. The voltage across the capacitor C3 will be increased to reach the threshold voltage VTH4, the time out signal OT will be changed from logical low into logical high. The flip-flop FF1 will be set and the flag signal FLAG will become logical high. The switch S1 will be turned on and the switch S2 will be turned off. The capacitor XCAP will be discharged by the current source IS.

When the electrical source is re-coupled to the switching converter 200, or the voltage across the capacitor XCAP is discharged to a safe threshold value, the comparing output signal CMPO is changed from logical low into logical high. The flip-flop FF1 is reset. The flag signal FLAG is changed from logical high into logical low. The switch S1 is turned off and the switch S2 is turned on. The timing circuit 209 is also reset. The switch S3 is turned on, and the voltage across the capacitor C3 is quickly discharged to zero. The time out signal OT is changed from logical high into logical low.

Figure 3:
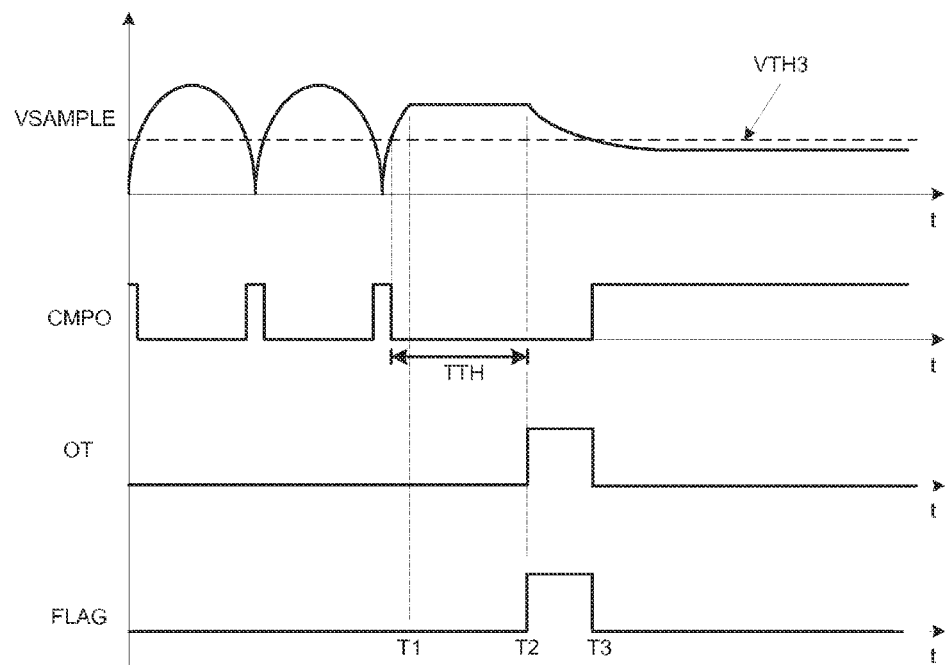
FIG. 3 is a working waveform of the discharge circuit shown in FIG. 2, in accordance with an embodiment of the present invention.

FIG. 3 is a working waveform of the discharge circuit shown in FIG. 2, in accordance with an embodiment of the present invention. Before time T1, the electrical source is coupled to the switching converter 200, and the sensing signal VSAMPLE is a periodical rectified sinusoidal wave. The timer 209 will be reset before the time threshold TTH is reached. The flag signal FLAG is maintained low, the switch S1 is turned off and the switch S2 is turned on.

At time T1, the electrical source is uncoupled from the switching converter 200. Because of the existence of the capacitor XCAP, the voltage VAC is maintained high, and the sensing signal VSAMPLE keeps larger than the threshold voltage VTH3. At time T2, the time threshold TTH of the timing circuit 209 is reached. The time out signal OT is changed from logical low into logical high. The flip-flop FF1 is set and the flag signal FLAG is changed from logical low into logical high. The switch S1 is turned on and the switch S2 is turned off. The capacitor XCAP is discharged by the current source IS. The sensing signal VSAMPLE as well as the voltage VAC is gradually decreased.

At time T3, the voltage VAC is reduced to reach the safe threshold value, and the sensing signal VSAMPLE reaches the threshold voltage VTH3. The comparing output signal CMPO is changed from logical low into logical high. The flip-flop FF1 is reset. The flag signal FLAG is changed from logical high into logical low. The switch S1 is turned off and the switch S2 is turned on. At the same time, the switch S3 is turned on, and the timing circuit 209 is reset.

Figure 4:
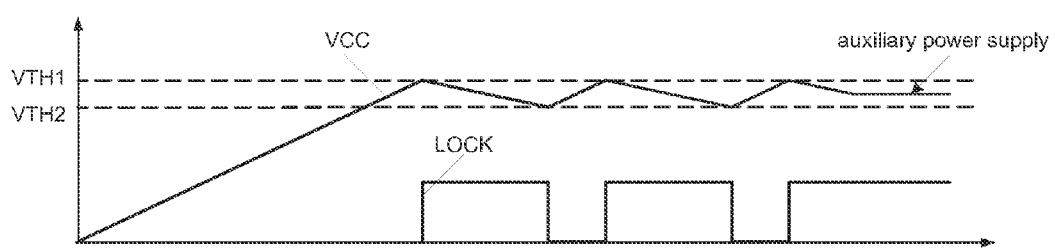
FIG. 4 is a waveform of the power supply voltage VCC during startup of the switching converter 200 shown in FIG. 2, in accordance with an embodiment of the present invention.

FIG. 4 is a waveform of the power supply voltage VCC during startup of the switching converter 200 shown in FIG. 2, in accordance with an embodiment of the present invention. During the startup period, the electrical source is coupled to the switching converter 200. The flag signal FLAG is logical low. The switch S1 is turned off and the switch S2 is turned on. When the power converter 200 just starts up, the power supply voltage VCC has not been built up and the switching circuit 201 is not in normal operation. The lock out signal LOCK generated by the comparator CMP1 is logical low. The transistor J2 is turned off and the transistor J1 is turned on. The current source IS is used to charge the capacitor CS, and the power supply voltage VCC is gradually increased. When the power supply voltage VCC is increased to reach the threshold voltage VTH1, the lock out signal LOCK is changed from logical low into logical high. The transistor J2 is turned on and the transistor J1 is turned off. The current source IS is turned off. The switching circuit starts to work, and instead of the current source IS, the auxiliary winding of the transformer T1 is used to provide energy to the capacitor CS.

Before the switching circuit reaches its steady state, the power supply voltage VCC may be reduced to reach the threshold voltage VTH2. The lock out signal LOCK is changed from logical high into logical low. The transistor J2 is turned off and the transistor J1 is turned on. The current source IS is used to charge the capacitor CS again. After the switching circuit reaches its steady state, the auxiliary winding of the transformer T1 may maintain the power supply voltage VCC at a predetermined value, such as 10V.

Figure 5:
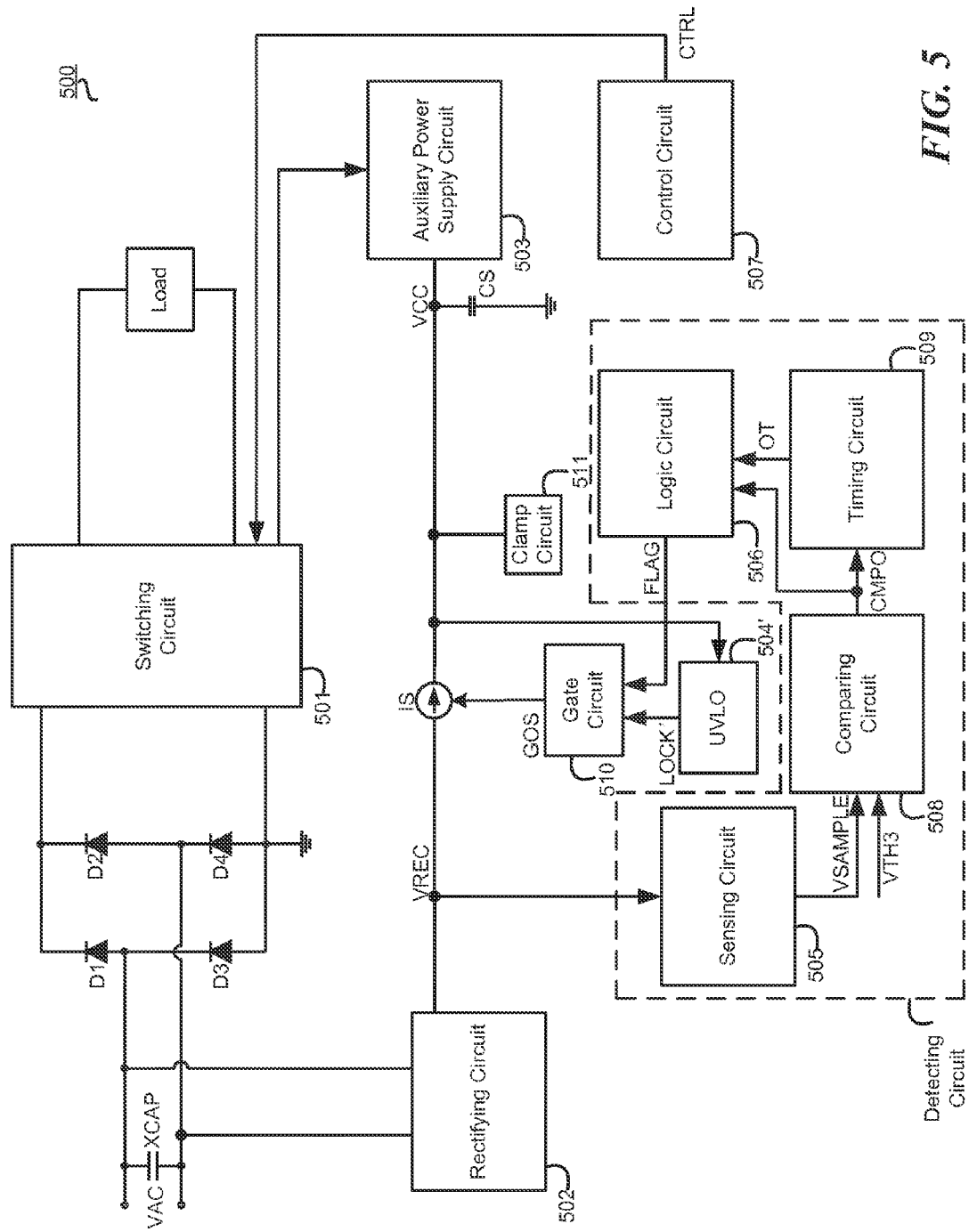
FIG. 5 is a block diagram of a switching converter 500 with a discharge circuit for an EMI filter capacitor, in accordance with an embodiment of the present invention.

FIG. 5 is a block diagram of a switching converter 500 with a discharge circuit for an EMI filter capacitor, in accordance with an embodiment of the present invention. Similar to the switching converter 100 shown in FIG. 1, the switching converter 500 comprises a EMI filter capacitor XCAP, a rectifier bridge consisting of diodes D1~D4, a switching circuit 501, a control circuit 50, a rectifying circuit 502 and a discharge circuit for the EMI filter capacitor.

The discharge circuit comprises a current source IS and a detecting circuit. The detecting circuit is configured to detect whether the electrical source is coupled to the input terminals of the switching converter 500, and configured to generate a flag signal FLAG based on the detection. The current source IS has an input terminal, an output terminal and a control terminal, wherein the input terminal is coupled to the output terminal of the rectifying circuit 502, the output terminal is coupled to the power supply capacitor CS, and the control terminal is coupled to the detecting circuit to receive the flag signal FLAG. When the electrical source is uncoupled from the input terminals of the switching converter 500, the current source IS is turned on to transfer the energy stored in the capacitor XCAP to the power supply capacitor CS.

In one embodiment, the discharge circuit further comprises an UVLO circuit 504' and a gate circuit 510. The UVLO circuit 504' has an input terminal and an output terminal, wherein the input terminal is coupled to the first terminal of the capacitor CS. The UVLO circuit 504' compares the power supply voltage VCC across the capacitor CS with threshold voltage VTH1 and VTH2, and generates a lock out signal LOCK' at the output terminal. The gate circuit 510 has a first input terminal, a second input terminal and an output terminal, wherein the first input terminal is coupled to the detecting circuit to receive the flag signal FLAG, the second input terminal is coupled to the output terminal of the UVLO circuit 504' to receive the lock out signal LOCK', and the output terminal is coupled to the control terminal of the current source IS. Based on the flag signal FLAG and the lock out signal LOCK, the gate circuit 510 generates a gate output signal GOS at its output terminal to turn on or turns off the current source IS. In one embodiment, when the electrical source is coupled to the switching converter 500 and the power supply voltage VCC is increased to reach the threshold voltage VTH1, the current source IS is turned off. When the electrical source is uncoupled from the switching converter 500 or the power supply voltage VCC is decreased to reach the threshold voltage VTH2, the current source IS is turned on.

In one embodiment, the discharge circuit further comprises a clamp circuit 511 couple to the first terminal of the capacitor CS. The clamp circuit 511 limits the maximum of the power supply voltage VCC to a clamp threshold voltage, such as 18V.

In one embodiment, the switching converter 500 further comprises an auxiliary power supply circuit 503. The auxiliary power supply circuit 503 has an input terminal and an output terminal, wherein the input terminal is coupled to the switching circuit 501, and the output terminal is coupled to the first terminal of the capacitor CS. When the power converter 500 just starts up, the power supply voltage VCC has not been built up and the switching circuit 501 is not in normal operation. The current source IS is used to provide energy to the capacitor CS. After the startup of the power converter 500 is finished, the auxiliary power supply circuit 503 is mainly used to provide energy to the capacitor CS. In one embodiment, the discharge circuit and the control circuit 507 are integrated in a controller, such as a control IC. The capacitor CS is used to provide the power supply voltage for the controller.

In one embodiment, the detecting circuit comprises a sensing circuit 505, a comparing circuit 508, a timing circuit 509 and a logic circuit 506. The structure of these circuits is substantially same to the corresponding circuits shown in FIG. 1, and will not be illustrated here.

Figure 6:
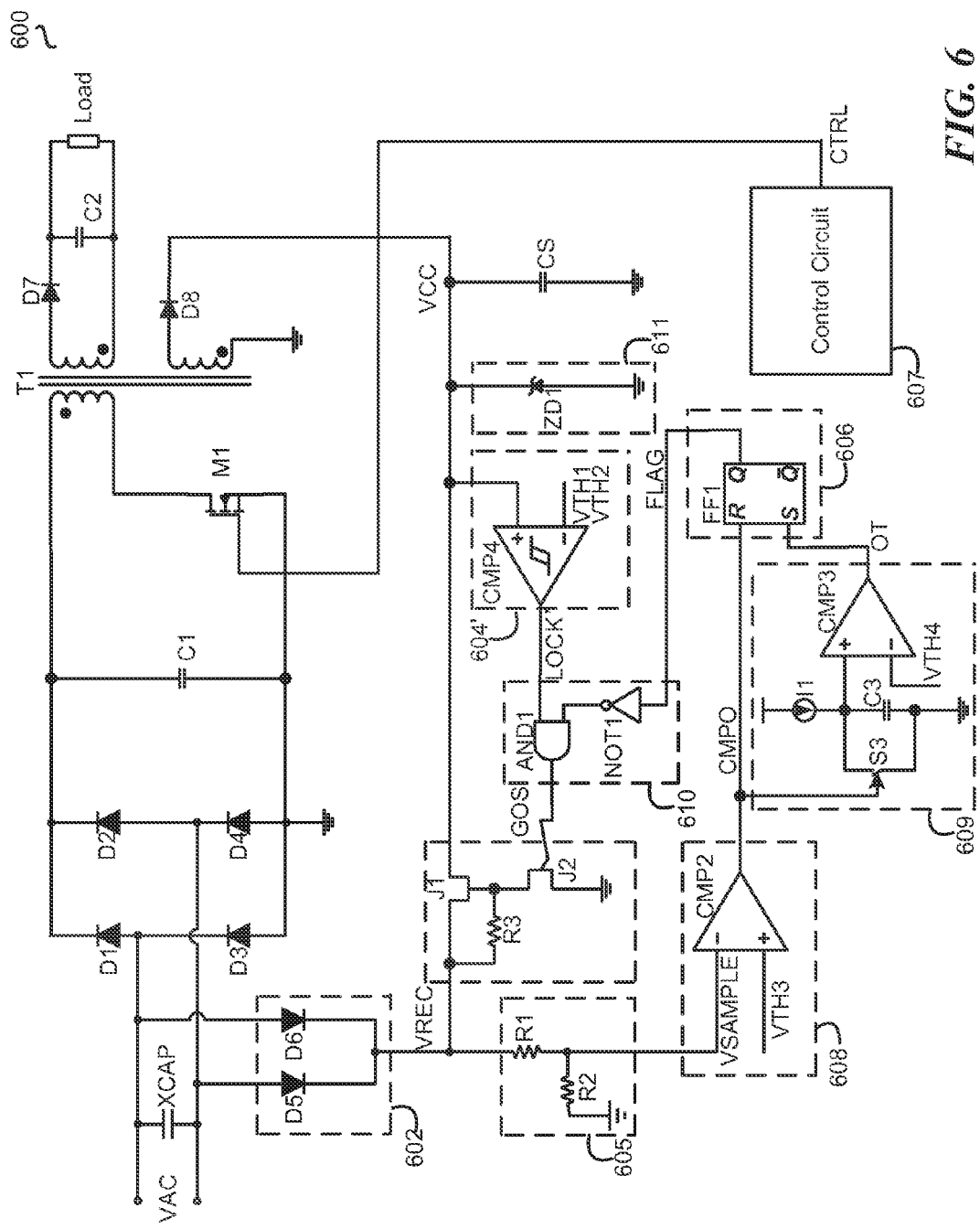
FIG. 6 schematically illustrates a switching converter 600 with a discharge circuit for an EMI filter capacitor, in accordance with an embodiment of the present invention.

FIG. 6 schematically illustrates a switching converter 600 with a discharge circuit for an EMI filter capacitor, in accordance with an embodiment of the present invention. Most of the circuits in the switching converter 600 are substantially same to the corresponding circuits shown in FIG. 2.

The UVLO circuit 604' comprises a hysteresis comparator CMP4. The hysteresis comparator CMP4 has a non-inverting input terminal, an inverting input terminal and an output terminal, wherein the non-inverting input terminal is coupled to the first terminal of the capacitor CS, the inverting input terminal is coupled to receive the threshold voltage VTH1 and VTH2, and the output terminal is configured to provide the lock out signal LOCK'. The gate circuit 610 comprises an AND gate circuit AND1 and a NOT gate circuit NOT1. The NOT gate circuit NOT1 has an input terminal and an output terminal, wherein the input terminal is coupled to the output terminal Q of the flip-flop FF1 to receive the flag signal FLAG. The AND gate circuit AND1 has a first input terminal, a second input terminal and an output terminal, wherein the first input terminal is coupled to the output terminal of the comparator CMP4 to receive the lock out signal LOCK', the second input terminal is coupled to the output terminal of the NOT gate circuit NOT1, the output terminal is coupled to the control terminal of the transistor J2 to provide the gate output signal GOS. The clamp circuit 611 comprises a zener diode ZD1. The zener diode ZD1 has an anode and a cathode, wherein the cathode is coupled to the first terminal of the capacitor CS, the anode is coupled to the ground. In other embodiments, the clamp circuit 611 may comprise other suitable elements.

In some applications, because of the parasitical capacitance, the rectifying signal VREC can not periodically reduce to be smaller than the safe threshold value even when the electrical source is coupled to the switching converter. So the detecting circuit illustrated in the above embodiments is not in normal operation in these applications. To solve this problem, in one embodiment, the detecting circuit further comprises a threshold adjusting circuit. The threshold adjusting circuit has an input terminal and an output terminal, wherein the input terminal is coupled to the output terminal of the sensing circuit to receive the sensing signal VSAMPLE, and wherein based on the peak value of the sensing signal VSAMPLE, the threshold adjusting circuit generates the threshold voltage VTH3 at the output terminal. The threshold voltage VTH3 generated by the threshold adjusting circuit is provided to the second input terminal of the comparing circuit. The threshold voltage VTH3 may be proportional to the peak value of the sensing signal VSAMPLE, such as 90%.

Figure 7:
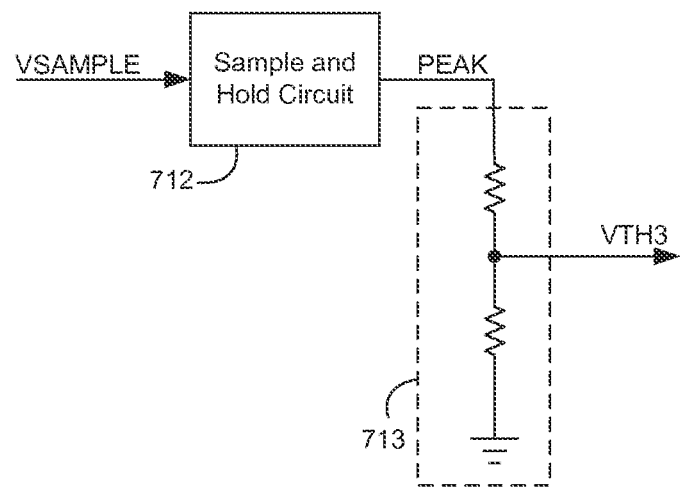
FIG. 7 schematically illustrates a threshold adjusting circuit in accordance with an embodiment of the present invention.

FIG. 7 schematically illustrates a threshold adjusting circuit in accordance with an embodiment of the present invention. The threshold adjusting circuit comprises a sample and hold circuit 712 and a voltage divider 713. The sample and hold circuit 712 has an input terminal and an output terminal, wherein the input terminal is coupled to the output terminal of the sensing circuit to receive the sensing signal VSAMPLE, and wherein based on the peak value of the sensing signal VSAMPLE, the sample and hold circuit 712 generates a sample and hold signal PEAK at the output terminal. In one embodiment, the sample and hold circuit 712 works to generate the sample and hold signal PEAK only when the electrical source is coupled to the switching converter. In another embodiment, the sample and hold circuit 712 samples and holds the peak value of the sensing signal VSAMPLE all the time, but refreshes the sample and hold signal PEAK only when the electrical source is coupled to the switching converter. The sample and hold signal PEAK is maintained when the electrical source is uncoupled from the switching converter. The voltage divider 713 has an input terminal and an output terminal, wherein the input terminal is coupled to the output terminal of the sample and hold circuit 712 to receive the sample and hold signal PEAK, the output terminal is coupled to the second input terminal of the comparing circuit to provide the threshold voltage VTH3. In one embodiment, the voltage divider 713 comprises a resistor divider.

Figure 8:
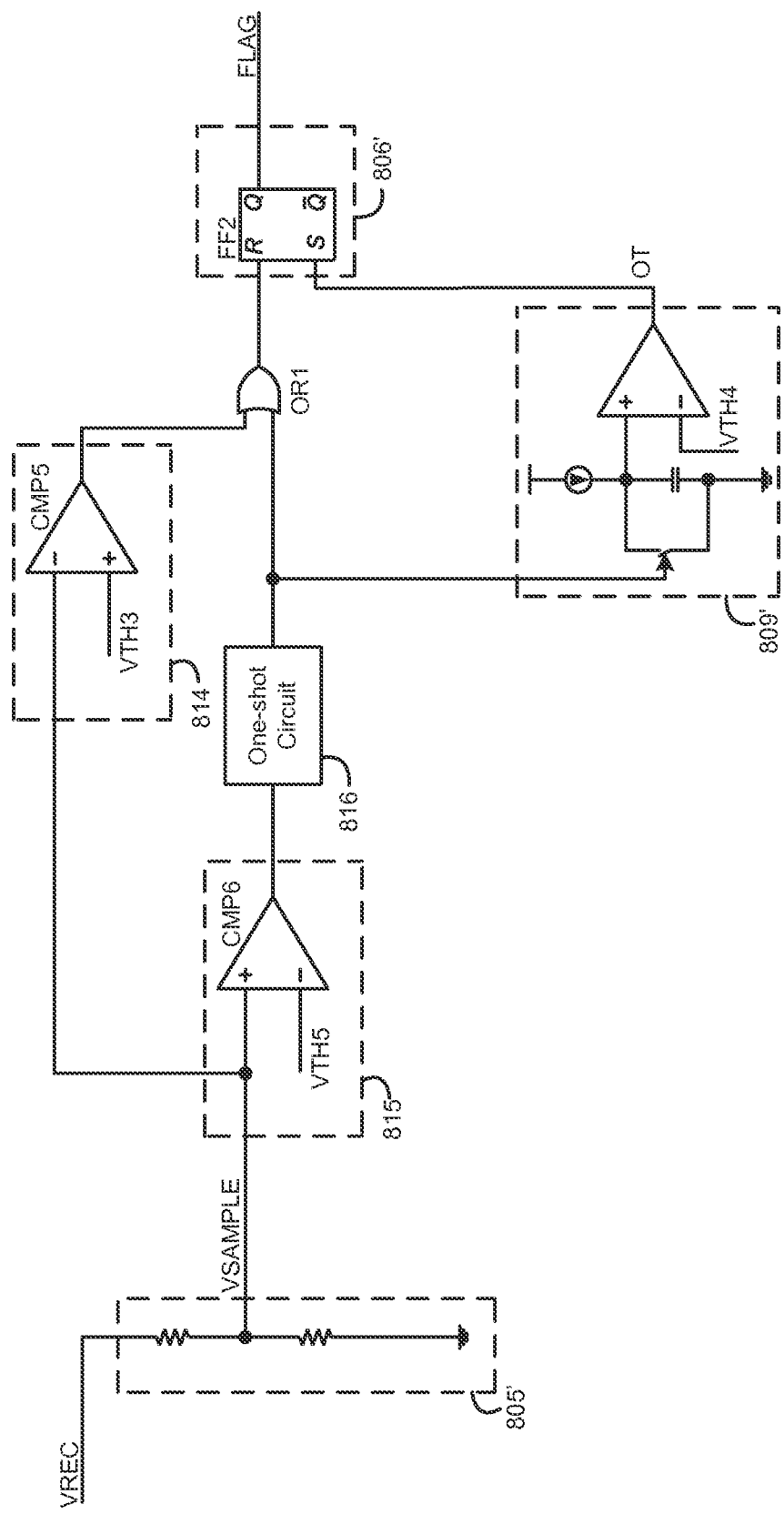
FIG. 8 schematically illustrates a detecting circuit in accordance with an embodiment of the present invention.

FIG. 8 schematically illustrates a detecting circuit in accordance with an embodiment of the present invention. The detecting circuit comprises a sensing circuit 805', a first comparing circuit 814, a second comparing circuit 815, a one shot circuit 816, an OR gate circuit OR1, a timing circuit 809' and a logic circuit 806'. The sensing circuit 805' is directly coupled to the input terminals of the switching converter, or indirectly coupled to the input terminals through a rectifying circuit. Based on the voltage across the input terminals of the switching converter, the sensing circuit 805' generates a sensing signal VSAMPLE. The first comparing circuit 814 has a first input terminal, a second input terminal and an output terminal, wherein the first input terminal is coupled to the sensing circuit 805' to receive the sensing signal VSAMPLE, the second input terminal is coupled to receive a threshold voltage VTH3. The second comparing circuit 815 has a first input terminal, a second input terminal and an output terminal, wherein the first input terminal is coupled to the sensing circuit 805' to receive the sensing signal VSAMPLE, the second input terminal is coupled to receive a threshold voltage VTH5.

The one shot circuit 816 has an input terminal and an output terminal, wherein the input terminal is coupled to the output terminal of the second comparing circuit 815. The OR gate circuit OR1 has a first input terminal, a second input terminal and an output terminal, wherein the first input terminal is coupled to the output terminal of the first comparing circuit 814, the second input terminal is coupled to the output terminal of the one shot circuit 816. The timing circuit 809' has an input terminal and an output terminal, wherein the input terminal is coupled to the output terminal of the one shot circuit 816, and wherein based on the output signal of the one shot circuit 816 and a time threshold TTH, the timing circuit 809' generates a time out signal OT at the output terminal. The logic circuit 806' has a first input terminal, a second input terminal and an output terminal, wherein the first input terminal is coupled to the output terminal of the OR gate circuit OR1, the second input terminal is coupled to the output terminal of the timing circuit 809' to receive the time out signal OT. Based on the output signal of the OR gate circuit OR1 and the time out signal OT, the logic circuit 806' generates the flag signal FLAG at the output terminal.

In one embodiment, as shown in FIG. 8, the sensing circuit 805' comprises a resistor divider, the first comparing circuit 814 comprises a comparator CMP5, the second comparing circuit 815 comprises a comparator CMP6. The logic circuit 806' comprises a flip-flop FF2, the structure of the timing circuit 809' is substantially same to that of the timing circuit 609 shown in FIG. 6. The threshold voltage VTH3 is a constant value corresponding to the safe threshold value, and the threshold voltage VTH5 is larger than the threshold voltage VTH3.

When the sensing signal VSAMPLE is changed from smaller into larger than the threshold voltage VTH5, the one shot circuit 816 is triggered to generate a short pulse. The flip-flop FF2 and the timing circuit 809' are both reset by the short pulse. The flag signal FLAG and the time out signal OT are logical low.

If the time threshold TTH of the timing circuit 809' is reached, the time out signal OT will be changed from logical low into logical high. The flip-flop FF2 will be set and the flag signal FLAG will become logical high. The capacitor XCAP will be discharged by the current source IS. When the voltage of the capacitor XCAP is discharged to a safe threshold value, the sensing signal VSAMPLE is decreased to reach the threshold voltage VTH3. The output signal of the comparator CMP5 is changed from logical low into logical high, and the flip-flop FF2 is reset. The flag signal FLAG is changed from logical high into logical low. If the electrical source is coupled to the switching converter again during the discharge of the capacitor XCAP, the one shot circuit 816 will be triggered when the sensing signal VSAMPLE rises across the threshold voltage VTH5. The flip-flop FF2 and the timing circuit 809' will both be reset, and the flag signal FLAG and the time out signal OT will be logical low. In one embodiment, the time threshold TTH of the timing circuit 809' is set to be larger than a half period of the AC electrical source.

In other embodiments, the detecting circuit shown in FIG. 8 may comprise a plurality of comparing circuits. The plurality of comparing circuits compare the sensing signal VSAMPLE with a plurality of threshold voltage, and generate a plurality of comparison result. Based on the plurality of comparison result, the one shot circuit 816 generates a pulse to reset the flip-flop FF2 and the timing circuit 809'.

Figure 9:
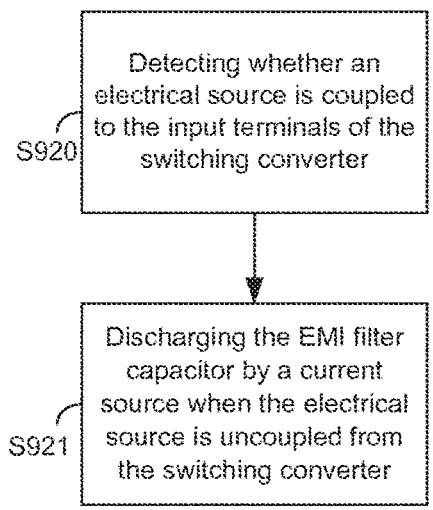
FIG. 9 is a flow chart of a method for discharging an EMI filter capacitor, in accordance with an embodiment of the present invention.

FIG. 9 is a flow chart of a method for discharging an EMI filter capacitor, in accordance with an embodiment of the present invention. The method comprises steps S920 and S921.

At step S920, whether an electrical source is coupled to the input terminals of the switching converter is detected. In one embodiment, the step S920 comprises: generating a sensing signal based on the voltage across the input terminals of the switching converter; comparing the sensing signal with the third threshold voltage to generate a comparing output signal; determining a time value based on the comparing output signal; and determining that the electrical source is uncoupled from the input terminals of the switching converter if the time value is longer than a time threshold. In one embodiment, the third threshold voltage varies with the peak value of the sensing signal.

At step S921, the EMI filter capacitor is discharged by a current source when the electrical source is uncoupled from the input terminals of the switching converter, wherein the current source is coupled to a power supply capacitor to provide a power supply voltage.

In one embodiment, when the electrical source is uncoupled from the input terminals of the switching converter, the current source is coupled to ground to discharge the EMI filter capacitor. When the electrical source is coupled to the input terminals of the switching converter, the current source is coupled to the power supply capacitor to provide energy to the power supply capacitor.

In another embodiment, when the electrical source is uncoupled from the input terminals of the switching converter, the current source is configured to transfer the energy stored in the EMI filter capacitor to the power supply capacitor.

In one embodiment, the step S920 comprises: generating a sensing signal based on the voltage across the input terminals of the switching converter; comparing the sensing signal with a fourth threshold voltage to output a comparing result; determining a time value based on the comparison result; determining that the electrical source is uncoupled from the input terminals of the switching converter if the time value is longer than a time threshold; comparing the sensing signal with a third threshold voltage; and if the sensing signal is smaller than the third threshold voltage, determining that the voltage across the EMI filter capacitor has been discharged to a safe threshold value, and stopping the discharge of the EMI filter capacitor.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A discharge circuit for an EMI filter capacitor, wherein the EMI filter capacitor is coupled between input terminals of a switching converter, the discharge circuit comprises:
   a detecting circuit configured to detect whether an electrical source is coupled to the input terminals of the switching converter, and configured to generate a flag signal based on the detection; and
   a current source having a first terminal and a second terminal, wherein the first terminal is coupled to the input terminals of the switching converter;
   a first switch having a first terminal, a second terminal and a control terminal, wherein the first terminal is coupled to the second terminal of the current source, the second terminal is coupled to ground, and the control terminal is coupled to the detecting circuit to receive the flag signal;
   a second switch having a first terminal, a second terminal and a control terminal, wherein the first terminal is coupled to the second terminal of the current source and the first terminal of the first switch, the second terminal is coupled to a power supply capacitor, and the control terminal is coupled to the detecting circuit to receive the flag signal; and
   an under voltage lock out circuit having an input terminal and an output terminal, wherein the input terminal is coupled to the first terminal of the first switch, and wherein the under voltage lock out circuit compares the voltage across the first switch with a first threshold voltage and a second threshold voltage, and generates a lock out signal at the output terminal to turn on or turn off the current source; wherein
   when the electrical source is uncoupled from the input terminals of the switching converter, the first switch is turned on and the second switch is turned off, the EMI filter capacitor is discharged by the current source; when the electrical source is coupled to the input terminals of the switching converter, the first switch is turned off and the second switch is turned on, the current source is configured to provide a power supply voltage across the power supply capacitor.

2. The discharge circuit of claim 1, wherein the detecting circuit comprises:
   a sensing circuit coupled to the input terminals of the switching converter, wherein based on the voltage across the input terminals of the switching converter, the sensing circuit generates a sensing signal;
   a comparing circuit having a first input terminal, a second input terminal and an output terminal, wherein the first input terminal is coupled to the sensing circuit to receive the sensing signal, the second input terminal is coupled to receive a third threshold voltage, and wherein the comparing circuit compares the sensing signal with the third threshold voltage and generates a comparing output signal at the output terminal;
   a timing circuit having an input terminal and an output terminal, wherein the input terminal is coupled to the output terminal of the comparing circuit to receive the comparing output signal, and wherein based on the comparing output signal and a time threshold, the timing circuit generates a time out signal at the output terminal; and
   a logic circuit having a first input terminal, a second input terminal and an output terminal, wherein the first input terminal is coupled to the output terminal of the comparing circuit to receive the comparing output signal, the second input terminal is coupled to the output terminal of the timing circuit to receive the time out signal, and wherein based on the comparing output signal and the time out signal, the logic circuit generates the flag signal at the output terminal.

3. The discharge circuit of claim 2, wherein the detecting circuit further comprises a threshold adjusting circuit having an input terminal and an output terminal, the input terminal is coupled to the sensing circuit to receive the sensing signal, and wherein based on the peak value of the sensing signal, the threshold adjusting circuit generates the third threshold voltage at the output terminal.

4. The discharge circuit of claim 1, wherein the detecting circuit comprises:
   a sensing circuit coupled to the input terminals of the switching converter, wherein based on the voltage across the input terminals of the switching converter, the sensing circuit generates a sensing signal;
   a first comparing circuit having a first input terminal, a second input terminal and an output terminal, wherein the first input terminal is coupled to the sensing circuit to receive the sensing signal, the second input terminal is coupled to receive a third threshold voltage;
   a second comparing circuit having a first input terminal, a second input terminal and an output terminal, wherein the first input terminal is coupled to the sensing circuit to receive the sensing signal, the second input terminal is coupled to receive a fourth threshold voltage;
   a one shot circuit having an input terminal and an output terminal, wherein the input terminal is coupled to the output terminal of the second comparing circuit;
   a second gate circuit having a first input terminal, a second input terminal and an output terminal, wherein the first input terminal is coupled to the output terminal of the first comparing circuit, the second input terminal is coupled to the output terminal of the one shot circuit;
   a timing circuit having an input terminal and an output terminal, wherein the input terminal is coupled to the output terminal of the one shot circuit, and wherein based on the output signal of the one shot circuit and a time threshold, the timing circuit generates a time out signal at the output terminal; and
   a logic circuit having a first input terminal, a second input terminal and an output terminal, wherein the first input terminal is coupled to the output terminal of the second gate circuit, the second input terminal is coupled to the output terminal of the timing circuit to receive the time out signal, and wherein based on the output signal of the second gate circuit and the time out signal, the logic circuit generates the flag signal at the output terminal.

5. A controller of a switching converter, wherein an EMI filter capacitor is coupled between input terminals of a switching converter, comprising:
 a control circuit configured to control switches in the switching converter;
 a detecting circuit configured to detect whether an electrical source is coupled to the input terminals of the switching converter, and configured to generate a flag signal based on the detection; and
 a current source coupled between the input terminals of the switching converter and a power supply capacitor, wherein the current source is configured to provide a power supply voltage across the power supply capacitor and wherein when the electrical source is uncoupled from the input terminals of the switching converter, the EMI filter capacitor is discharged by the current source; wherein
 the detecting circuit comprises:
  a sensing circuit coupled to the input terminals of the switching converter, wherein based on the voltage across the input terminals of the switching converter, the sensing circuit generates a sensing signal;
  a comparing circuit having a first input terminal, a second input terminal and an output terminal, wherein the first input terminal is coupled to the sensing circuit to receive the sensing signal, the second input terminal is coupled to receive a third threshold voltage, and wherein the comparing circuit compares the sensing signal with the third threshold voltage and generates a comparing output signal at the output terminal;
  a timing circuit having an input terminal and an output terminal, wherein the input terminal is coupled to the output terminal of the comparing circuit to receive the comparing output signal, and wherein based on the comparing output signal and a time threshold, the timing circuit generates a time out signal at the output terminal;
  a logic circuit having a first input terminal, a second input terminal and an output terminal, wherein the first input terminal is coupled to the output terminal of the comparing circuit to receive the comparing output signal, the second input terminal is coupled to the output terminal of the timing circuit to receive the time out signal, and wherein based on the comparing output signal and the time out signal, the logic circuit generates the flag signal at the output terminal; and
  a threshold adjusting circuit having an input terminal and an output terminal, wherein the input terminal is coupled to the sensing circuit to receive the sensing signal, and wherein based on the peak value of the sensing signal, the threshold adjusting circuit generates the third threshold voltage at the output terminal.

6. The controller of claim 5, further comprising:
 a first switch having a first terminal, a second terminal and a control terminal, wherein the first terminal is coupled to the current source, the second terminal is coupled to ground, and the control terminal is coupled to the detecting circuit to receive the flag signal; and
 a second switch having a first terminal, a second terminal and a control terminal, wherein the first terminal is coupled to the current source and the first terminal of the first switch, the second terminal is coupled to the power supply capacitor, and the control terminal is coupled to the detecting circuit to receive the flag signal; wherein
 when the electrical source is uncoupled from the input terminals of the switching converter, the first switch is turned on and the second switch is turned off; when the electrical source is coupled to the input terminals of the switching converter, the first switch is turned off and the second switch is turned on.

7. The controller of claim 5, wherein when the electrical source is uncoupled from the input terminals of the switching converter, the current source is configured to transfer the energy stored in the EMI filter capacitor to the power supply capacitor.

8. A method for discharging an EMI filter capacitor coupled between input terminals of a switching converter, comprising:
 detecting whether an electrical source is coupled to the input terminals of the switching converter; and
 discharging the EMI filter capacitor by a current source when the electrical source is uncoupled from the input terminals of the switching converter, wherein the current source is coupled to a power supply capacitor to provide a power supply voltage; wherein
 the step of detecting comprises:
  generating a sensing signal based on the voltage across the input terminals of the switching converter;
  comparing the sensing signal with a third threshold voltage to generate a comparing output signal, wherein the third threshold voltage varies with the peak value of the sensing signal;
  determining a time value based on the comparing output signal; and
  determining that the electrical source is uncoupled from the input terminals of the switching converter if the time value is longer than a time threshold.

9. The method of claim 8, wherein:
 when the electrical source is uncoupled from the input terminals of the switching converter, the current source is coupled to ground to discharge the EMI filter capacitor; and
 when the electrical source is coupled to the input terminals of the switching converter, the current source is coupled to the power supply capacitor to provide energy to the power supply capacitor.

10. The method of claim 8, wherein when the electrical source is uncoupled from the input terminals of the switching converter, the current source is configured to transfer the energy stored in the EMI filter capacitor to the power supply capacitor.

* * * * *